US012752634B2

(12) United States Patent
Takahashi et al.

(10) Patent No.: US 12,752,634 B2
(45) Date of Patent: Oct. 6, 2026

(54) VEHICLE CONTROL DEVICE

(71) Applicants: MITSUBISHI JIDOSHA KOGYO KABUSHIKI KAISHA, Tokyo (JP); The University of Tokyo, Tokyo (JP)

(72) Inventors: Ryota Takahashi, Tokyo (JP); Hiroshi Fujimoto, Tokyo (JP); Hiroyuki Fuse, Tokyo (JP); Naoki Takahashi, Tokyo (JP); Shunsuke Matsuo, Tokyo (JP); Yutaro Okamura, Tokyo (JP); Ryosuke Koga, Tokyo (JP)

(73) Assignees: MITSUBISHI JIDOSHA KOGYO KABUSHIKI KAISHA, Tokyo (JP); THE UNIVERSITY OF TOKYO, Tokyo (JP)

( * ) Notice: Subject to any disclaimer, the term of this patent is extended or adjusted under 35 U.S.C. 154(b) by 112 days.

(21) Appl. No.: 18/566,933

(22) PCT Filed: Aug. 1, 2022

(86) PCT No.: PCT/JP2022/029414
§ 371 (c)(1),
(2) Date: Dec. 4, 2023

(87) PCT Pub. No.: WO2023/013565
PCT Pub. Date: Feb. 9, 2023

(65) Prior Publication Data
US 2024/0270084 A1 Aug. 15, 2024

(30) Foreign Application Priority Data
Aug. 6, 2021 (JP) ................................ 2021-129862

(51) Int. Cl.
*B60L 15/20* (2006.01)
*B60W 10/08* (2006.01)

(52) U.S. Cl.
CPC ............ *B60L 15/20* (2013.01); *B60W 10/08* (2013.01); *B60W 2520/10* (2013.01); *B60W 2710/083* (2013.01); *B60W 2720/26* (2013.01)

(58) Field of Classification Search
CPC .......... B60L 15/20; B60L 3/102; B60L 3/106; B60L 15/2009; B60L 15/2036;
(Continued)

(56) References Cited

U.S. PATENT DOCUMENTS 5,291,408 A 3/1994 Thatcher
5,345,155 A * 9/1994 Masaki .................. B60L 50/51 318/52
(Continued)

FOREIGN PATENT DOCUMENTS

EP 2 261 072 B1 10/2012
EP 3 031 663 A1 6/2016
(Continued)

OTHER PUBLICATIONS

Fujimoto et al., "Review of Traction and Braking Control for Electric Vehicle", 2012 IEEE Vehicle Power and Propulsion Conference, Seoul, Korea (South), 2012, pp. 1292-1299, doi: 10.1109/VPPC.2012.6422491.
(Continued)

*Primary Examiner* — Frederick M Brushaber
(74) *Attorney, Agent, or Firm* — Birch, Stewart, Kolasch & Birch, LLP

(57) ABSTRACT

The vehicle control device (10) includes: an arithmetic unit (11) that calculates a target slip ratio (y) serving as a target value of a slip ratio (λ) of the wheel (5); a limiting unit (12) that sets an upper limit value ($y_{max}$) of the target slip ratio (y), the upper limit value ($y_{max}$) being based on at least a vehicle velocity (V) of the vehicle (1), and limits the target slip ratio (y) calculated by the arithmetic unit (11) to a value
(Continued)

equal to or less than the upper limit value ($y_{max}$); and a controlling unit (13) that controls driving torque of the vehicle (1) such that a wheel velocity that achieves the target slip ratio (y) limited by the limiting unit (12) is obtained.

5 Claims, 5 Drawing Sheets

(58) Field of Classification Search
CPC ............. B60W 10/08; B60W 2520/10; B60W 2710/083; B60W 2720/26; B60W 30/02; B60T 8/175; Y02T 10/72
See application file for complete search history.

(56) References Cited

U.S. PATENT DOCUMENTS

| | | | | |
|---|---|---|---|---|
| 6,549,840 | B1 | 4/2003 | Mikami et al. | |
| 8,886,435 | B2 * | 11/2014 | Nagami | F16H 61/143 701/90 |
| 10,144,293 | B2 * | 12/2018 | Suzuki | B60W 10/08 |
| 2009/0038866 | A1 * | 2/2009 | Abe | F16H 48/36 180/65.7 |
| 2009/0132137 | A1 * | 5/2009 | Takenaka | B60W 40/101 701/70 |
| 2009/0164078 | A1 * | 6/2009 | Oue | F16H 61/143 701/67 |
| 2009/0187302 | A1 * | 7/2009 | Takenaka | B62D 6/04 701/33.8 |
| 2010/0312449 | A1 | 12/2010 | Savaresi et al. | |
| 2016/0221446 | A1 * | 8/2016 | Suzuki | B60L 50/66 |
| 2021/0033182 | A1 * | 2/2021 | Murakami | B60K 23/0808 |
| 2021/0370779 | A1 | 12/2021 | Ford | |

FOREIGN PATENT DOCUMENTS

| | | | |
|---|---|---|---|
| GB | 2577930 | A | 4/2020 |
| JP | 7-25327 | A | 1/1995 |
| JP | 2005-124399 | A | 5/2005 |
| JP | 2006-136173 | A | 5/2006 |
| JP | 2009-65793 | A | 3/2009 |
| JP | 4637136 | B2 | 2/2011 |
| JP | 4907390 | B2 | 3/2012 |

OTHER PUBLICATIONS

Fujimoto et al., "Development and Control of Electric Vehicle with Variable Drive Unit system", Summarized Papers of technical sessions of 2013 JSAE Annual Congress (Spring), 2013, No. 8-13, pp. 17-20.

International Search Report for PCT/JP2022/029414 mailed on Oct. 4, 2022.

Maeda et al., "Four-wheel Driving-force Distribution Method Based on Driving Stiffness and Slip Ratio Estimation for Electric Vehicle with In-wheel Motors", In 2012 IEEE Vehicle Power and Propulsion Conference, VPPC 2012, pp. 1286-1291, Article 6422490, https://doi.org/10.1109/VPPC.2012.6422490.

Takano et al., "Driving Force Control Method Based on High Accuracy Slip Ratio Control", Mazda technical review, 2015, No. 32, pp. 228-233.

Wakui et al., "Gear Collision Reduction of Geared In-wheel-motor by Effective Use of Load-side Encoder", IECON 2019—45th Annual Conference of the IEEE Industrial Electronics Society, vol. 1, IEEE, 2019, pp. 3615-3620.

Written Opinion of the International Searching Authority for PCT/JP2022/029414 mailed on Oct. 4, 2022.

Yoshimura et al., "Driving Torque Control Method for Electric Vehicle with In-Wheel Motors", The transactions of the Institute of Electrical Engineers of Japan, D, 2011, vol. 131, No. 5, pp. 721-728.

Extended European Search Report for European Application No. 22852984.8, dated Oct. 16, 2024.

International Preliminary Report on Patentability and English translation of the Written Opinion of the International Searching Authority for International Application No. PCT/JP2022/029414, dated Feb. 6, 2024.

Japanese Office Action for corresponding Japanese Application No. 2023-540321, dated Jan. 23, 2024, with English translation.

Chinese Office Action and Search Report for Chinese Application No. 202280036647.2, dated Mar. 12, 2026, with English translation of the Office Action.

* cited by examiner

VEHICLE CONTROL DEVICE

TECHNICAL FIELD

The present invention relates to a vehicle control device that controls a slip state of a wheel mounted on a vehicle.

BACKGROUND

A technique of driving torque control has conventionally been known which calculates a target slip ratio of a vehicle and adjusts driving torque of the vehicle such that an actual slip ratio of a wheel matches the target slip ratio. The value of the target slip ratio is calculated on the basis of demanded driving force of the vehicle, for example. In addition, an excessively large target slip ratio causes the wheel to easily slip. For the above, the target slip ratio is limited to a range of a predetermined upper limit value or less (see Patent Documents 1 to 3).

PRIOR ART DOCUMENT

Patent Document

[Patent Document 1] Japanese Patent Laid-open Publication No. 2009-65793 (JP 2009-065793 A)

[Patent Document 2] Japanese Patent No. 4637136 (JP 4637136 B)

[Patent Document 3] Japanese Patent No. 4907390 (JP 4907390 B)

SUMMARY OF INVENTION

Problems to be Solved by Invention

On the other hand, an optimal slip ratio may vary with a running state of the vehicle and road surface conditions. Therefore, if the driving torque control is performed while the upper limit value of the target slip ratio is fixed, the running performance and the stability may be degraded. For example, an excessively small upper limit value of the target slip ratio makes the frictional force acting between the wheel and the road surface small, so that the running performance (driving force, braking force) may decrease. In contrast, an excessively large upper limit value of the target slip ratio reduces the lateral force acting on the wheel, so that the stability of the vehicle body posture may be degraded.

With the foregoing problems in view, one of the objects of the present disclosure is to provide a vehicle control device that can enhance the running performance and the stability of a vehicle. In addition to this object, influences and effects which are derived from each configuration of an embodiment to carry out the invention to be described below and which conventional technique does not attain can be regarded as other objects of the present disclosure.

Means to Solve Problem

The present embodiment can be achieved by means of an embodiment and an application. The disclosed vehicle control device solves at least part of the above problem.

The vehicle control device disclosed herein controls a slipping state of a wheel mounted on a vehicle. The vehicle control device includes: an arithmetic unit that calculates a target slip ratio serving as a target value of a slip ratio of the wheel; a limiting unit that sets an upper limit value of the target slip ratio, the upper limit value being based on at least a vehicle velocity of the vehicle, and limits the target slip ratio calculated by the arithmetic unit to a value equal to or less than the upper limit value; and a controlling unit that controls driving torque of the vehicle such that a wheel velocity that achieves the target slip ratio limited by the limiting unit is obtained.

Effect of Invention

The disclosed vehicle control device can driving performance and stability of a vehicle.

EMBODIMENT TO CARRY OUT INVENTION

1. Vehicle

Figure 1:
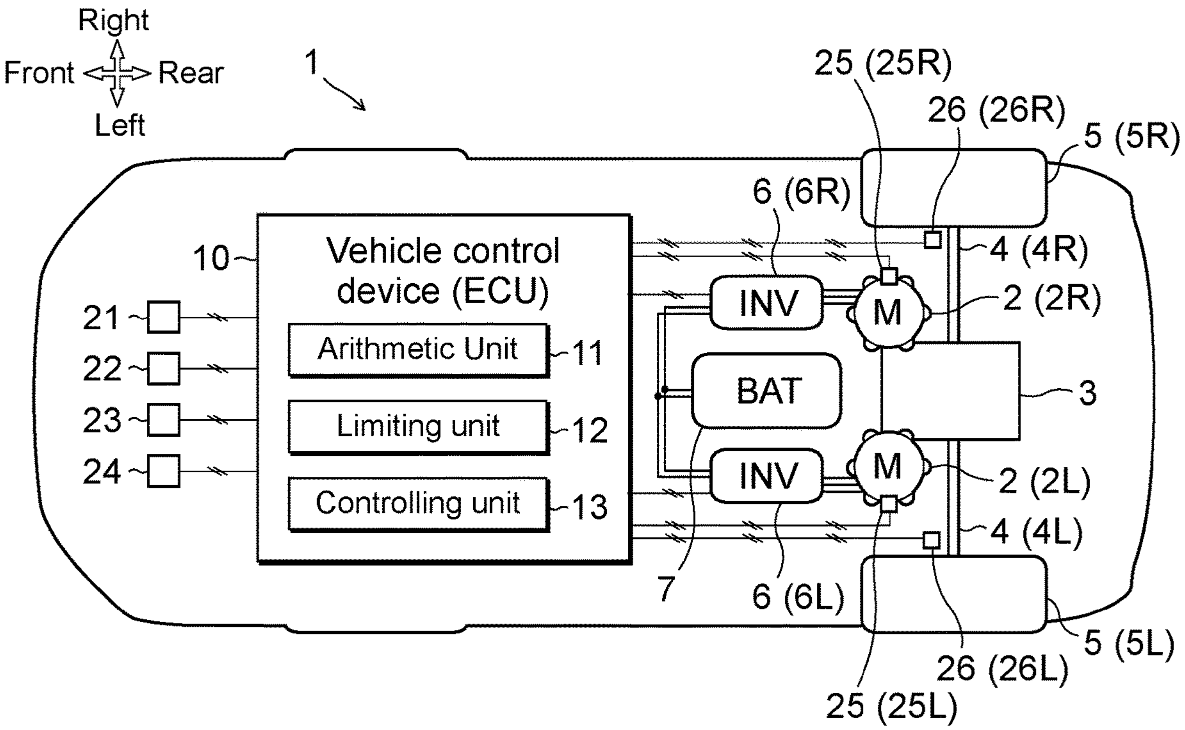
FIG. 1 is a diagram illustrating a vehicle that adopts a vehicle control device according to an embodiment.

A vehicle control device according to an embodiment is applied to a vehicle 1 shown in FIG. 1. The vehicle 1 includes left and right wheels 5 (wheels) arranged side by side in the vehicle width direction, a power distribution mechanism 3 (differential mechanism) for applying a torque difference to the left and right wheels 5, and a pair of electric motors 2 each coupled to the power distribution mechanism 3. The alphabetical character R or L appended to a numerical reference sign indicate the arranged position of the element represented by the reference signs (i.e., whether the element is on the left or right side of the vehicle). For example, a reference sign 5R represents one (i.e., right wheel) of the left and right wheels 5 positioned on the right side (Right) of the vehicle 1, and a reference sign 5L represents the other (i.e., left wheel) positioned on the left side (Left) of the vehicle 1.

The electric motors 2 have a function of driving at least either of front wheels and rear wheels of the vehicle 1, and may have a function of driving all four wheels. Between the pair of electric motors 2 positioned on the right side is also referred to as a right electric motor 2R (right motor) and the other positioned on the left side is also referred to as a left electric motor 2L (left motor). The right electric motor 2R and the left electric motor 2L operate independently of each other, and can individually output the driving forces having different magnitudes from each other. These electric motors 2 are connected to the power distribution mechanism 3 via a pair of reduction mechanism provided separately from each other. The right electric motor 2R and the left electric motor 2L of this embodiment have the same rated power and are provided in a pair.

The vehicle 1 includes a power distribution device 3 that amplifies the torque difference between the pair of electric motors 2 and distributes the torque to left and right wheels 5. The power distribution mechanism 3 of the present embodiment is a differential mechanism having an Active Yaw Control (AYC) function, and is interposed between an axle 4 (left axle 4L) connected to the left wheel 5L and an axle 4 (right axle 4R) connected to the right wheel 5R. The yaw control function is a function that adjusts the yaw moment by actively controlling the sharing ratio of the driving forces (driving torques) of the left and right wheels and stabilizes the posture of the vehicle. A planetary gear mechanism, a differential gear mechanism, and the like are incorporated in the power distribution mechanism 3. The vehicle driving apparatus including the pair of electric motors 2 and the power distribution device 3 is also referred to as a Dual-Motor AYC (DM-AYC) device.

Figure 2:
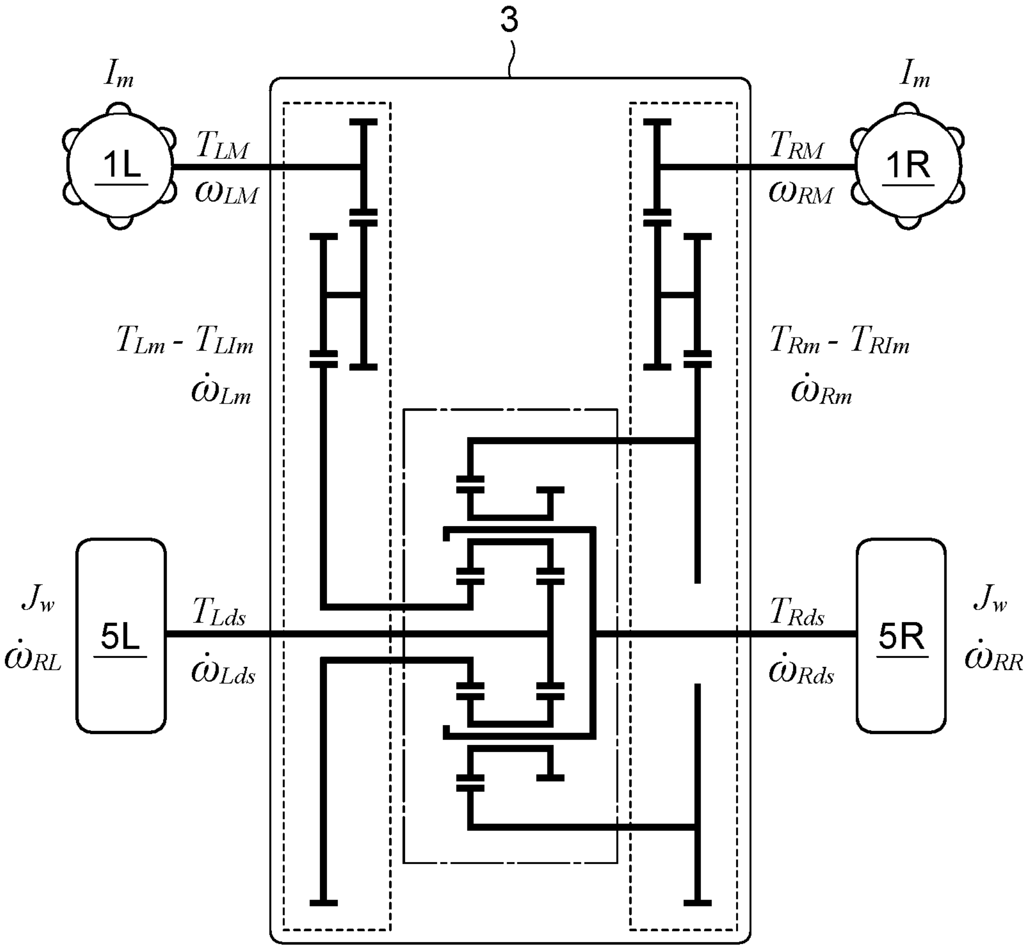
FIG. 2 is a schematic diagram showing a structure of a driving system of the vehicle of FIG. 1.

As shown in FIG. 2, the power distribution mechanism 3 includes a pair of reduction mechanisms (gear trains surrounded by dashed lines in FIG. 2) for reducing the rotational velocity of the electric motors 2 and a transmission mechanism (gear trains surrounded by one-dot dashed lines in FIG. 2). Each reduction mechanism is a mechanism that increases the torque by reducing the torque (driving force) output from the corresponding electric motor 2. The reduction ratio of the reduction mechanism is appropriately set according to the output characteristic and the performance of the electric motor 2. If the torque performances of the electric motors 2 are sufficiently high, the reduction mechanisms may be omitted. The transmission mechanism is a mechanism that amplifies the difference between torques transmitted to the left and right wheels 5.

The transmission mechanism of the power distribution mechanism 3 shown in FIG. 2 includes a pair of planetary gear mechanisms. These planetary gear mechanisms have a structure in which rotation axes of planetary gears provided on respective carriers are connected to each other. Each carrier supports the planetary gear so as to be able to rotate, and supports the planetary gear so as to be able to revolve between the sun gear and the ring gear. The driving force transmitted from the left and right electric motors 2 is inputted into the ring gear and the sun gear of one of the planetary gear mechanisms. The driving force transmitted to the left and right wheels 5 is taken out from the sun gear and the carrier of the other planetary gear mechanism. The other planetary gear mechanism does not have a ring gear. Note that the structure of the power distribution mechanism 3 shown in FIG. 2 is merely exemplary for achieving the yaw control function, and can be replaced with another known structures.

The electric motors 2L and 2R are electrically connected to the battery 7 via respective inverters 6 (6L and 6R). The inverters 6 are converting devices (DC-AC converting devices) that mutually convert the electric power (DC power, Direct Current power) of the DC circuit of the battery 7 side and the electric power (AC power, Alternating Current power) of the AC circuit of the electric motor 2 side. The battery 7 is, for example, a lithium-ion secondary battery or a nickel-metal hydride secondary battery. The battery 7 is a storage cell capable of supplying a high-voltage DC current of several hundred volts. While the electric motors 2 are power running, the DC power is converted into AC power by the inverters 6 and the converted AC power is then supplied to the electric motors 2. At the time of power generation of motor 2, the generated electric power is converted into DC electric power by inverter 6 and is charged into battery 7. The operating status of each inverter 6 is controlled by the vehicle control device 10.

The vehicle control device 10 is one of electronic controlling unit (ECU) mounted on the vehicle 1. The vehicle control device 10 includes a processor (central processing unit), a memory (main memory), a storage device (storage), an interface device, and the like, which do not appear in the drawings, and these elements are communicably coupled to each other via an internal bus. The contents of the determination and the control performed by the vehicle control device 10 are recorded and stored as firmware or an application program in the memory, and when the program is to be executed, the contents of the program are expanded in a memory space and executed by the processor.

As shown in FIG. 1, an accelerator position sensor 21, a brake sensor 22, a steering angle sensor 23, a mode selection switch sensor 24, resolvers 25, and wheel velocity sensors 26 are connected to the vehicle control device 10. The accelerator position sensor 21 is a sensor that detects the amount (accelerator opening degree) of depressing of the accelerator pedal and the depression velocity. The brake sensor 22 is a sensor that detects the amount (brake pedal stroke) of depressing of the brake pedal and the depression velocity. The steering angle sensor 23 is a sensor that detects a steering angle (actual rudder angle or steering angle of the steering) of the left and right wheels 5. The mode selection switch sensor 24 is a device in which a switch for setting a running mode (for example, a snow mode, a tarmac mode) of the vehicle 1 that can be arbitrarily selected by an occupant and a sensor that detects an operation status of the switch are integrated.

The resolvers 25 are sensors that detect the rotational angular velocities (i.e., motor angular velocity $\omega_{Rm}$, $\omega_{Lm}$), and are provided one for each of the electric motors 2. The wheel velocity sensors 26 are sensors that detect rotational angular velocities (wheel angular velocity $\omega_{Rds}$, $\omega_{Lds}$) outputted from the power distribution mechanism 3 to the axles 4, and are provided in the vicinity of connecting points between the power distribution mechanism 3 and the left and right axle 4. The vehicle control device 10 controls the operating status of the inverters 6 on the basis of the information detected by these sensors 21 to 26 and thereby controls the outputs of the pair of electric motors 2. Note that the type of sensor that detects the rotational angular velocity of each electric motor 2 is not limited to the resolver 25, and may alternatively be another sensor (e.g., a hall sensor or an encoder).

2. Control Model

Description will now be made in relation to a control model related to the present embodiment. When the rotating velocity of the wheels 5 of a vehicle is changed while applying braking and driving torque (braking torque and driving torque) to the wheels 5, the relative velocity with respect to the vehicle body velocity changes (i.e., the vehicle slips), and the ground contact surface deforms to generate braking and driving force. Here, if the body weight is represented by M; the vehicle body velocity (vehicle velocity) is represented by V; the braking and driving force is represented by $F_x$; the inertia (moment of inertia) of the wheel is represented by $J_w$; the wheel angular velocity is represented by $\omega_{ds}$; the axle torque (braking and driving torque) is represented by $T_{ds}$; the effective radius of the tire is represented by r; the wheel velocity is represented by $V_w$; and the slip ratio is represented by λ (slip ratio obtained by normalizing the relative velocity of the wheel velocity to the body velocity), the following equations are established.

[Math 1]

$$J_w\dot{\omega}_{ds} = T_{ds} - rF_x \quad \text{Expression 1}$$

$$M\dot{V} = F_x \quad \text{Expression 2}$$

$$V_w = r\omega_{ds} \quad \text{Expression 3}$$

-continued $$\lambda = \frac{V_w - V}{\max(V_w, V)} \quad \text{Expression 4}$$

Further, a variable normalized by dividing the braking and driving force by the normal force is referred to as a friction coefficient μ. In general, the friction coefficient μ and the slip ratio λ have nonlinear relationship. The value of the friction coefficient μ comes to be the maximum value $\mu_{max}$ at a predetermined slip ratio (optimum slip ratio $\lambda_{p0}$). Here, the transfer function (which expresses the relationship between the input and the output in a function of the complex number s) of the wheel angular velocity with respect to the axle torque input is expressed as follows. The term $J_n$ in the following expression represents nominal inertia. In other words, the equivalent inertia of the wheel 5 viewed from the drive-side at a certain slip ratio $\lambda_n$ (nominal slip ratio) can be regarded as $J_n$.

[Math 2]

$$\frac{\omega}{T_{ds}} = \frac{1}{J_w + r^2 M(1 - \lambda_n)} \cdot \frac{1}{s} = \frac{1}{J_n(\lambda)s} \quad \text{Expression 5}$$

Figure 3:
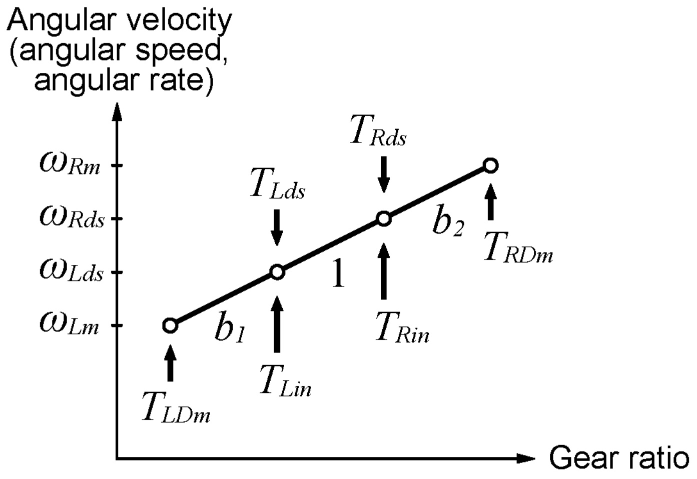
FIG. 3 is a velocity diagram of a planetary-gear system of FIG. 2.

FIG. 3 is a velocity diagram related to an input and an output of the power distribution mechanism 3. The terms $b_1$, $b_2$ in the drawing represent the equivalent second velocity ratios determined in terms of the structures of the gears incorporated in the power distribution unit 3. In the present embodiment, the following equation is established.

[Math 3]

$$\begin{pmatrix} T_{Rin} \\ T_{Lin} \end{pmatrix} = \begin{pmatrix} b_2 + 1 & -b_1 \\ -b_2 & b_1 + 1 \end{pmatrix} \begin{pmatrix} T_{RDm} \\ T_{LDm} \end{pmatrix} = K \begin{pmatrix} T_{RDm} \\ T_{LDm} \end{pmatrix} \quad \text{Expression 6}$$

The terms $T_{Rin}$ and $T_{Lin}$ represent the input-side torques after deceleration and coupling by the gears which torque also include the motor-side inertia torque. The terms $T_{Rm}$ and $T_{Lm}$ represent the torque obtained by subtracting the motor-side inertia torque, and can be expressed as follows.

[Math 4]

$$\begin{pmatrix} T_{Rm} \\ T_{Lm} \end{pmatrix} = \begin{pmatrix} T_{RDm} - T_{RIm} \\ T_{LDm} - T_{LIm} \end{pmatrix} = \begin{pmatrix} GT_{RM} - G^2 I_m \dot{\omega}_{Rm} \\ GT_{LM} - G^2 I_m \dot{\omega}_{Lm} \end{pmatrix} \quad \text{Expression 7}$$

The terms $T_{RIm}$ and $T_{LIm}$ represent the inertia torques of the respective electric motors 2. Besides, the terms $I_m$ represents inertia of each electric motor 2, and the terms $\omega_{Rm}$, $\omega_{Lm}$ represent angular velocities of the respective electric motors after the first deceleration. The relationship between motor angular velocities $\omega_{Rm}$ and $\omega_{Lm}$ and the drive-shaft-side angular velocities $\omega_{Rds}$ and $\omega_{Lds}$ is expressed by the following expression.

[Math 5]

$$\begin{pmatrix} \omega_{Rm} \\ \omega_{Lm} \end{pmatrix} = \begin{pmatrix} b_2 + 1 & -b_2 \\ -b_1 & b_1 + 1 \end{pmatrix} \begin{pmatrix} \omega_{Rds} \\ \omega_{Lds} \end{pmatrix} = B \begin{pmatrix} \omega_{Rds} \\ \omega_{Lds} \end{pmatrix} \quad \text{Expression 8}$$

The torques $T_{Rds}$ and $T_{Lds}$ transmitted to the drive shaft are the torques after coupling obtained by subtracting the inertia torque of the respective electric motor 2, and are expressed by the following expression.

[Math 6]

$$\begin{pmatrix} T_{Rds} \\ T_{Lds} \end{pmatrix} = K \begin{pmatrix} T_{Rm} \\ T_{Lm} \end{pmatrix} \quad \text{Expression 9}$$

In addition, the following expressions can be used to calculate the inertia torque using the wheel velocity.

[Math 7]

$$T_{Rds} = \{(b_2 + 1)T_{Rm} - b_1 T_{Lm}\} - \left[\{(b_2 + 1)^2 + b_1^2\}G^2 I_m - \{b_1(b_1 + 1) + b_2(b_2 + 1)\}G^2 I_m \frac{\dot{\omega}_{Lds}}{\dot{\omega}_{Rds}}\right]\dot{\omega}_{Rds} \quad \text{Expression 10}$$

$$T_{Lds} = \{(b_1 + 1)T_{Lm} - b_2 T_{Rm}\} - \left[\{(b_1 + 1)^2 + b_2^2\}G^2 I_m - \{b_1(b_1 + 1) + b_2(b_2 + 1)\}G^2 I_m \frac{\dot{\omega}_{Rds}}{\dot{\omega}_{Lds}}\right]\dot{\omega}_{Lds} \quad \text{Expression 11}$$

3. Vehicle Control Device

Figure 4:
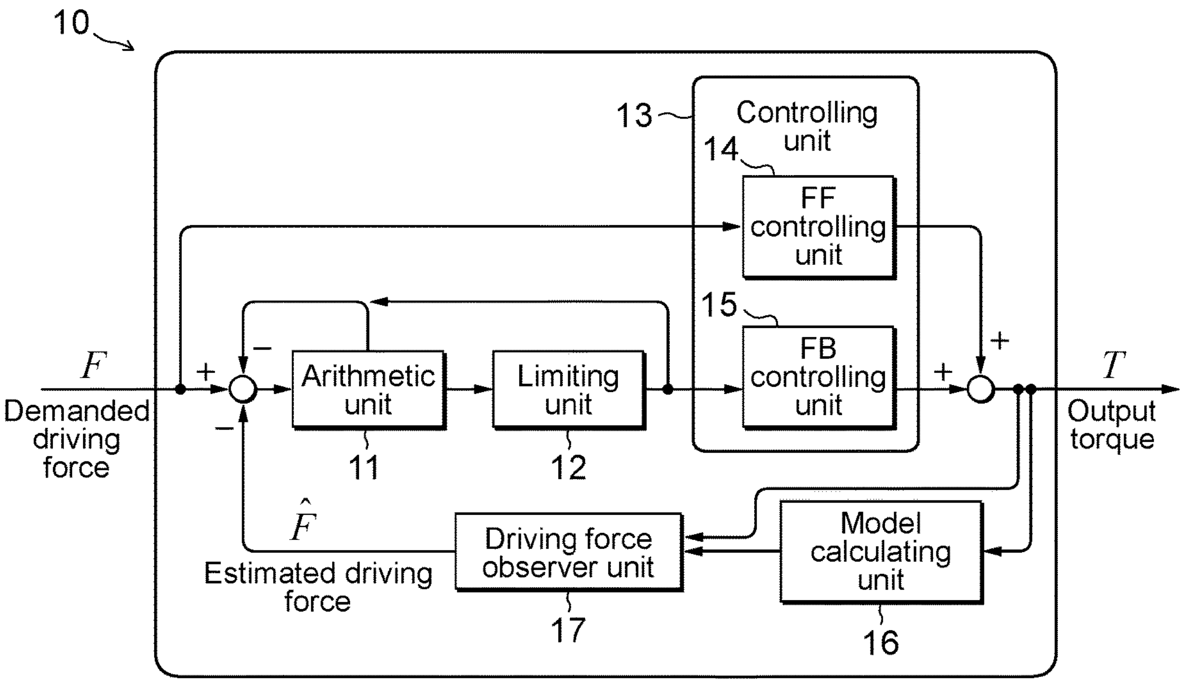
FIG. 4 is a block diagram showing a configuration of a vehicle control device of FIG. 1.

As shown in FIG. 1, at least an arithmetic unit 11, a limiting unit 12, and a controlling unit 13 are provided inside the vehicle control device 10. In the present embodiment, the controlling unit 13 includes an FF controlling unit 14 and an FB controlling unit 15, as shown in FIG. 4. In addition to the above elements, a model calculating unit 16 and a driving force observer unit 17 are provided. These elements are obtained by classifying the functions of the vehicle control device 10 for descriptive convenience. These elements may be each described as an independent program and may also be described as a combined program of multiple elements. A program corresponding to each element is stored in the memory or the storage device of the vehicle control device 10 and executed by the processor.

An arithmetic unit 11 independently of each other calculates target slip ratios y (slip ratio command values) serving as target values of the slip ratios λ of the wheels 5R and 5L. The value of each target slip ratio y is calculated on the basis of at least the demanded driving force of the vehicle 1. In the present embodiment, the value of each target slip ratio y is calculated on the basis of the demanded driving force and the estimated driving force of the vehicle 1. For example, each target slip ratio y is calculated on the basis of a value obtained by integrating a value (error) obtained by subtracting the estimated driving force from the demanded driving force. The demanded driving force is calculated on the basis of respective piece of information detected by the sensors 21 to 26, for example. Here, the definition of the target slip ratio y is shown below.

[Math 8]

$$y = \frac{V_w - V}{V} \quad \text{Expression 12}$$

This target slip ratio y has the same definition as that of the slip ratio λ at the time the vehicle 1 is being braked (decelerated). The relationship between the slip ratio λ and the target slip ratio y at the time of braking is expressed by the following expression. If the slip ratio λ is sufficiently small, the two values are almost the same.

[Math 9]

$$y = \frac{\lambda}{1-\lambda} \quad \text{Expression 13}$$

If the value of the target slip ratio y calculated by the arithmetic unit 11 is excessively large, the value (absolute value) is clipped in a range equal to or smaller than the upper limit value $y_{max}$ set by the limiting unit 12 to be described below. In this case, the value exceeding the upper limit value $y_{max}$ is discarded as the surplus value. Therefore, in order to reflect the surplus value in the next and subsequent arithmetic operations, a calculation configuration may be adopted in which the surplus value is multiplied with a predetermined gain and the obtained product is then introduced to the upstream side of the arithmetic unit 11 and is subtracted from the demanded driving force.

Figure 5:
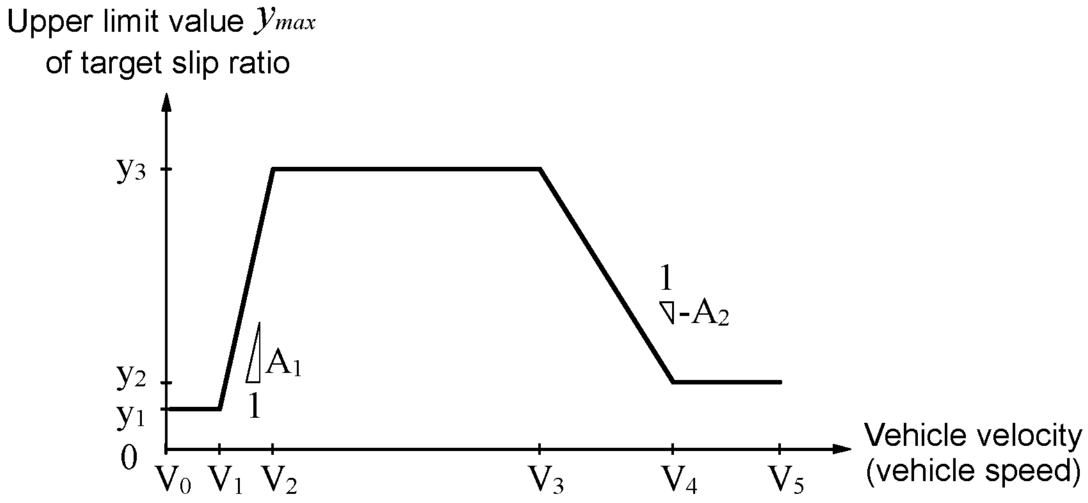
FIG. 5 is a map showing a relationship between a vehicle velocity and an upper limit value set by a limiting unit of FIG. 1.

The limiting unit 12 independently of each other sets the upper limit values $y_{max}$ of the target slip ratios y on the basis of at least vehicle velocity V of the vehicle 1, and limits the absolute values |y| of the target slip ratios y calculated by the arithmetic unit 11 to a value equal to or less than the upper limit values $y_{max}$. The target slip ratios y limited by the upper limit value $y_{max}$ also includes values on the braking side (negative side). The vehicle velocity V here may be a value calculated on the basis of the wheel angular velocities $\omega_{Lds}$ and $\omega_{Rds}$ detected by the wheel velocity sensors 26, but is preferably a value calculated on the basis of the motor angular velocities $\omega_{Rm}$ and $\omega_{Lm}$ detected by the respective resolvers 25. The upper limit values $y_{max}$ function as the limiters for the respective target slip ratios y. FIG. 5 is a map showing the relationship between the vehicle velocity V and the upper limit value $y_{max}$. FIG. 5 shows the limiting characteristics of the driving side (positive side). This map is stored in the vehicle control device 10 (e.g., inside the limiting unit 12 or on a memory that the limiting unit 12 can access).

The above-described map sets therein a first vehicle velocity range of from $V_1$ to $V_2$, in which range the upper limit value $y_{max}$ increases with an increase in vehicle velocity V, and a second vehicle velocity range of from $V_3$ to $V_4$, in which range the upper limit value $y_{max}$ decreases with an increase in vehicle velocity V. The first vehicle velocity range of from $V_1$ to $V_2$ means a range in which the vehicle velocity V is from the first vehicle velocity $V_1$ to the second vehicle velocity $V_2$. The second vehicle velocity range of from the vehicle velocity $V_3$ to the vehicle velocity $V_4$ means a range in which the vehicle velocity is from the third vehicle velocity $V_3$ to the fourth vehicle velocity $V_4$. The magnitude relationship of the vehicle velocity V is $0<V_1<V_2<V_3<V_4$, and the second vehicle velocity range of from $V_3$ to $V_4$ is a vehicle velocity range higher than the first vehicle velocity range of from $V_1$ to $V_2$.

As shown in FIG. 5, the upper limit value $y_{max}$ set in the first vehicle velocity range of from $V_1$ to $V_2$ has a characteristic of increasing so as to have an ascent gradient with increase of the vehicle velocity V, and the ascent gradient is $A_1$. On the other hand, the upper limit value $y_{max}$ set in the second vehicle velocity range of from $V_3$ to $V_4$ has a characteristic of decreasing so as to have a descent gradient with increase of the vehicle velocity V, and the descent gradient is $-A_2$. Here, these gradients are set such that the absolute value $|A_1|$ of the ascent gradient is larger than the absolute value $|-A_2|$ of the descent gradient as comparing the absolute values of these two gradients.

By setting the absolute value $|A_1|$ of the ascent gradient to a relatively large value, the upper limit value $y_{max}$ comes to be lager with an increase of the vehicle velocity V, so that the target slip ratio y easily approaches the optimum slip ratio $\lambda_{p0}$. In addition, if the absolute value $|-A_2|$ of the descent gradient is set to a value equal to or larger than the absolute value $|A_1|$ of the ascent gradient, the upper limit value $y_{max}$ will suddenly decrease after the vehicle velocity V has risen to a certain extent, and the torque will be excessively suppressed. On the other hand, such lowering of feeling can be avoided by setting the absolute value of the descent gradient $|-A_2|$ to be smaller than the absolute value $|A_1|$ of the ascent gradient.

Furthermore, the above map sets therein a third vehicle velocity range of from $V_0$ to $V_1$ in which range the upper limit value $y_{max}$ is set to a first predetermined value $y_1$ irrespective of the magnitude of the vehicle velocity V, and a fourth vehicle velocity range of from $V_4$ to $V_5$ in which range the upper limit value $y_{max}$ is set to a second predetermined value y irrespective of the magnitude of the vehicle velocity V. The third vehicle velocity range of from $V_0$ to $V_1$ means a range in which the vehicle velocity V is from a predetermined vehicle velocity $V_0$ to the first vehicle velocity $V_1$, and the fourth vehicle velocity range of from the vehicle velocity $V_4$ to the vehicle velocity $V_5$ means a range in which the vehicle velocity is from the fourth vehicle velocity $V_4$ to the fifth vehicle velocity $V_5$. The relationship of the magnitudes of the vehicle velocity V is $0\leq V_0<V_1$, and $V_4<V_5$.

The third vehicle velocity region of from $V_0$ to $V_1$ is a region on the lower velocity side of the first vehicle velocity region of from $V_1$ to $V_2$, and the fourth vehicle velocity region of from $V_4$ to $V_5$ is a region on the higher velocity side of the second vehicle velocity region of from $V_3$ to $V_4$. Here, the first predetermined value $y_1$ is set to a value smaller than the second predetermined value $y_2$. In the fifth vehicle velocity region of from $V_2$ to $V_3$ sandwiched between the first vehicle velocity range of from $V_1$ to $V_2$ and the second vehicle velocity range of from $V_3$ to $V_4$, the upper limit value $y_{max}$ is set to a third predetermined value $y_3$ irrespective of the magnitude of the vehicle velocity V. The magnitude relationship of the upper limit $y_{max}$ is $y_1<y_2<y_3$.

By setting the first predetermined value $y_1$ to a relatively small value (a value smaller than the second predetermined value $y_2$), slippage immediately after the stopped vehicle 1 starts traveling is strongly restricted, and the acceleration is likely to increase. On the other hand, by setting the third predetermined value $y_3$ to a relatively large value (a value larger than the first predetermined value y and the second predetermined value $y_2$), it is easy to maintain the target slip ratio y within the range of slip ratio $\lambda$ where the frictional force of the wheels 5R and 5L increases, and thus the driving force tends to easily increase. Further, by setting the second given value $y_2$ to a relatively small value (at least a value smaller than the third predetermined value $y_3$), generation of vibrations caused by slippage and torque-suppression in a medium to high velocity range can be prevented. Compared with at the time of the start of the vehicle 1, the acceleration tends to easily increase if target slip ratio y is not excessively limited in the medium to high velocity range. This means that, by setting the second predetermined value y to a value larger than the first predetermined value $y_1$, the acceleration performance is also improved as well as the vibration damping performance.

Note that a parameter except for the vehicle velocity V may be reflected in the upper limit value $y_{max}$. For example, the upper limit value $y_{max}$ may be set in accordance with an operation amount by the driver of the vehicle 1, a vehicle state (e.g., lateral acceleration, yaw rate), and a road surface state. As a specific example, in a case where the running mode of the vehicle 1 is the snow mode, the value of the gain X for correcting the value of the upper limit value $y_{max}$ is set to be smaller than the gain when the running mode of the vehicle 1 is the tarmac mode. Alternatively, when the road surface is slippery (when the estimated value of the road-surface friction coefficient is smaller than that of normal road surface) or when the acceleration/deceleration acting on the vehicle 1 is large, the value of the gain X is set small, and when the road surface is not slippery or when the acceleration/deceleration acting on vehicle 1 is small, the value of the gain X is set large.

The gain X is a parameter to be multiplied by the upper limit value $y_{max}$, and is set in the range of, for example, 0 or more. If the gain X is further smaller than one, the product of the upper limit $y_{max}$ and the gain X comes to be smaller whereas if the gain X is further larger than one, the product of upper limit value $y_{max}$ and the gain X comes to be larger. The upper limit value after being multiplied with the gain X is used as the upper limit $y_{max}$ of the final target slip ratio y. Since this setting more strongly suppresses slippage as the road surface is more slippery, the vehicle body posture is more stabilized.

The controlling unit 13 controls the driving torque of the vehicle 1 for each of the wheels 5R and 5L such that a wheel velocity that achieves the target slip ratio y limited by the limiting unit 12 is obtained. The controlling unit 13 is provided with the FF controlling unit 14 that carries out control based on the demanded driving force and the FB controlling unit 15 that carries out control based on the target slip ratio y limited by the limiting unit 12. In the FF controlling unit 14, the demanded wheel torque of each of the wheels 5L and 5R is calculated by multiplying the demanded driving force with the effective radius r of the wheel 5L or 5R to be controlled. If the wheels 5R and 5L adhere, the left side of the expression 1 is sufficiently small and the axle torque $T_{ds}$ almost matches the product $rF_x$ of the effective radius r of the tire and the braking and driving force $F_x$. Therefore, a driving force substantially equal to the driving force command value can be generated by the feedforward (FF) control, and the slight error is to be compensated for by feed-back (FB) control of the driving force control system.

In the FB controlling unit 15, an amount of feed-back control on the torque of each of the wheels 5R and 5L is calculated. The sum of the demanded wheel torque calculated by the FF controlling unit 14 and the amount of feed-back control calculated by the FB controlling unit 15 is the final output torque T for the corresponding one of the wheels 5R and 5L. On the basis of the output torque T, the operating status of the pair of the electric motors 2 are controlled. Any known method can be applied to a method of calculating for converting the torque of the axle 4 into the torque of each electric motor 2.

In calculating the amount of feed-back control, the FB controlling unit 15 multiplies the vehicle velocity V of the previous arithmetic cycle with the sum of the target slip ratio y and one. Furthermore, the product is divided by the effective radius r of the corresponding one of the wheels 5R and 5L to be controlled to calculate an angular velocity target value ω* of each of the wheels 5R and 5L. After that, an amount (e.g., P1 control amount) of feed-back control on the torque is calculated such that the difference between the actual angular velocity ω and the angular velocity target value ω* of corresponding one of the wheels 5R and 5L in the previous arithmetic cycle becomes small (ideally, the difference becomes 0). Instead of the vehicle velocity V and the angular velocity ω in the previous arithmetic cycle, estimated values of the vehicle velocity V and angular velocity ω calculated by the model calculating unit 16 may be used.

In designing the wheel velocity control using the pole placement method, assuming that the pole is a complex conjugate, the real part is −a (a>0), and the imaginary part is b, the wheel velocity control is PI (proportional integral) control and the proportional gain $K_p$ and the integral gain $K_i$ are expressed as follows. Here, if b=0, the response of the wheel velocity control loop is critical damping because it is a real-weight root.

[Math 10]

$$K_p = 2J_n a \qquad \text{Expression 14}$$

$$K_i = J_n(a^2 + b^2) \qquad \text{Expression 15}$$

The model calculating unit 16 calculates, based on a predetermined vehicle model, estimated values of a vehicle velocity, the wheel velocity, the vehicle body acceleration, and the like when the wheels 5R and 5L are driven by the output torque T. These estimated values can be derived, for example, by applying a known scheme of arithmetic for converting the torque of the electric motor 2 into the torque of the axle 4.

The driving force observer unit 17 calculates an estimated driving force based on at least the output torque T. Here, the inertia torque $J_{ws}$ of each of the left and right wheels 5 is calculated on the basis of the wheel velocity calculated by the model calculating unit 16, for example. Then, the estimated axle torque is calculated by subtracting the inertia torque $J_{ws}$ from the output torque T. The estimated driving force is calculated by dividing the estimated axle torque by the effective radius r of corresponding one of the wheels 5R and 5L.

The above inertia torque $J_{ws}$ can also be calculated from values detected by the resolvers 25. For example, on the basis of the above expression 8, the wheel velocity of each of left and right wheels 5 (each of the angular velocities $\omega_{Rds}$ and $\omega_{Lds}$ on the drive shaft side) is estimated from the motor angular velocities $\omega_{Rm}$ and $\omega_{Lm}$ detected by the corresponding resolvers 25. Further, each inertia torque $J_{ws}$ of each of the left and right wheels 5 corresponds to the second term of the right side in expression 10 and also the second term of the right side in Expression 11, and can therefore be calculated from the respective wheel velocities. Thereafter, the estimated driving force is calculated by dividing the estimated axle torque obtained by subtracting the inertia torque $J_{ws}$ from the output torque T by the effective radius r of corresponding one of the wheels 5R and 5L.

4. Action and Effect (1) In the above embodiment, the vehicle control device 10 is provided with the arithmetic unit 11, the limiting unit 12, and the controlling unit 13. The arithmetic unit 11 calculates target slip ratios y serving as target values of the slip ratios λ of the wheels 5R and 5L. The limiting unit 12 sets the upper limit value $y_{max}$ of the target slip ratio y on the basis of at least vehicle velocity V of the vehicle 1, and limits the target slip ratio y calculated by the arithmetic unit 11 to the upper limit value $y_{max}$ or less. The controlling unit 13 controls the driving torque of the vehicle 1 such that a wheel velocity that achieves the target slip ratio y limited by the limiting unit 12 is obtained.

This configuration makes the target slip ratio y to be brought close to an optimum value corresponding to the vehicle velocity V, so that the running performance and the stability of the vehicle 1 can be enhanced. In particular, as compared with the conventional control that sets a fixed upper limit value $y_{max}$, the velocity range that allows the slippage of the wheels 5L and 5R and the velocity range that restricts the slippage can be appropriately discriminated, so that the running performance and the stability of the vehicle 1 can be enhanced.

(2) In the above-described embodiment, the limiting unit 12 may set the upper limit value $y_{max}$ in accordance with an operation amount by the driver of the vehicle 1, a vehicle state (e.g., lateral acceleration, yaw rate), and a road surface state. For example, by setting the upper limit value $y_{max}$ according to the driving mode selected by the mode selection switch sensor 24, the driving performance and the stability of the vehicle 1 can be further enhanced. In addition, by reducing the upper limit $y_{max}$ when the road surface is slippery or when the acceleration/deceleration acting on the vehicle 1 is large, the vehicle body posture can be more stabilized by strongly suppressing the slippage. On the other hand, when the road surface is not slippery very much or when the acceleration/deceleration acting on the vehicle 1 is small, the target slip ratio y can be brought close to the optimum slip ratio Apo, so that the running performance of the vehicle 1 can be enhanced.

(3) In the above embodiment, the arithmetic unit 11 may calculate the target slip ratio y based on the demanded driving force and the estimated driving force of the vehicle 1. This configuration makes the responsiveness of the feedback control to be enhanced so that the target slip ratio y can be accurately controlled. Consequently, the running performance and the stability of the vehicle 1 can be enhanced.

(4) In the above embodiment, the limiting unit 12 may set the upper limit value $y_{max}$ of the target slip ratio y at each of left and right wheels 5, using the rotational angular velocities (motor angular velocities $\omega_{Rm}$ and $\omega_{Lm}$) of the electric motors 2. This configuration can enhance the responsiveness and the controllability of the target slip ratio y as compared with a case where the upper limit value $y_{max}$ is set using, for example, a vehicle velocity V based on the detected value (wheel angular velocity $\omega_{Lds}$ and $\omega_{Rds}$) by the wheel velocity sensor 26. Consequently, the running performance and the stability of the vehicle 1 can be enhanced.

(5) As shown in FIG. 5, the map defining the relationship between the vehicle velocity V and the upper limit value $y_{max}$ sets therein the first vehicle velocity range of from $V_1$ to $V_2$, in which range the upper limit value $y_{max}$ increases with an increase in vehicle velocity V, and the second vehicle velocity range of from $V_3$ to $V_4$ on the higher velocity side of the first vehicle velocity range, in which the second vehicle velocity range the upper limit value $y_{max}$ decreases with an increase in vehicle velocity V. In addition, the absolute value $|A_1|$ of the ascent gradient in the first vehicle velocity range of from $V_1$ to $V_2$ is set to be larger than the absolute value $|-A_2|$ of the descent gradient in the second vehicle velocity range of from $V_3$ to $V_4$. This configuration makes the target slip ratio y in a low velocity range to be brought close to optimum slip ratio $\lambda_{p0}$ at an early stage, so that the running performance of the vehicle 1 can be enhanced. In addition, it is possible to avoid excessive torque suppression in the medium to higher velocity range and also lowering of feeling.

(6) The map shown in FIG. 5 sets therein the third vehicle velocity range of from $V_0$ to $V_1$ on the lower side of the first vehicle velocity range of from $V_1$ to $V_2$ in which third vehicle velocity range the upper limit value $y_{max}$ is set to the first predetermined value $y_1$ irrespective of the magnitude of the vehicle velocity V, and the fourth vehicle velocity range of from $V_4$ to $V_5$ on the higher side of the second vehicle velocity range of from $V_3$ to $V_4$ in which fourth vehicle velocity range the upper limit value $y_{max}$ is set to the second predetermined value $y_2$ irrespective of the magnitude of the vehicle velocity V. The first predetermined $y_1$ is set to be smaller than the second predetermined value $y_2$. This configuration can suppress slippage when the vehicle 1 starts (at an extremely low velocity), and can enhance the acceleration performance. Further, since generation of vibrations caused by slippage and torque-suppression in a medium to high velocity range can be prevented, the vibration damping performance and the acceleration performance can be enhanced.

5. Modifications

The foregoing embodiment is merely illustrative and is not intended to preclude the application of various modifications and techniques not explicitly set forth in the present examples. The configurations of the present embodiment can be variously modified without departing from the scope thereof. Also, the configuration can be selected or omitted according to the requirement or appropriately combined.

For example, the above embodiment assumes that the vehicle control device 10 is applied to the rear wheels of the vehicle 1, but alternatively, the vehicle control device 10 may be similarly applied to the front wheels or to both the front and rear wheels. By performing at least the same control as that performed in the above embodiment in the vehicle 1 provided with the vehicle control device 1 that controls the slipping state of the wheels 5L and 5R, the same effects as those of the above embodiment can be achieved.

In achieving the vehicle control device of the above embodiment, the methods for controlling driving force described in the following reference can be referred.

Reference 1: Hiroshi Fujimoto, Takeshi Takano, Hidetoshi Nobumoto, Toshimi Okazaki, "Driving Force Control Method Based on High Accuracy Slip Ratio Control", Mazda technical review, No. 32, pp. 228-233, 2015

Reference 2: Hiroshi Fujimoto, Junya Amada, Takayuki Miyajima, "Development and Control of Electric Vehicle with Variable Drive Unit system", Summarized Papers of technical sessions of 2013 JSAE Annual Congress (Spring), No. 8-13, pp. 17-20, 2013

Reference 3: Masataka Yoshimura, Hiroshi Fujimoto, "Driving Torque Control Method for Electric Vehicle with In-Wheel Motors", The transactions of the Institute of Electrical Engineers of Japan, D, Vol. 131, No. 5, p. 721-728, 2011

DESCRIPTION OF REFERENCE SIGNS

1 vehicle
2 electric motor
3 power distribution mechanism (differential mechanism)
4 axle (wheel axle)
5 left and right wheels (wheel)
6 inverter
7 battery
10 vehicle control device (ECU, Electronic Controlling Unit)
11 arithmetic unit
12 limiting unit

13 controlling unit
14 FF controlling unit (Feedforward controlling unit)
15 FB controlling unit (Feedback controlling unit)
16 model calculating unit
17 driving force observer unit
21 accelerator position sensor
22 brake sensor
23 steering angle sensor
24 mode selection switch sensor
25 resolver
26 wheel velocity sensor
$\lambda$ slip ratio
$\lambda_{p0}$ optimum slip ratio
y target slip ratio
$y_{max}$ upper limit value

The invention claimed is:

1. A vehicle control device that controls a slipping state of a wheel mounted on a vehicle, the vehicle control device comprising:

an arithmetic unit that calculates a target slip ratio serving as a target value of a slip ratio of the wheel;

a limiting unit that sets an upper limit value of the target slip ratio, the upper limit value being based on at least a vehicle velocity of the vehicle, and limits the target slip ratio calculated by the arithmetic unit to a value equal to or less than the upper limit value; and a controlling unit that controls driving torque of the vehicle such that a wheel velocity that achieves the target slip ratio limited by the limiting unit is obtained, wherein the arithmetic unit calculates the target slip ratio based on a demanded driving force and an estimated driving force, the target slip ratio being calculated on the basis of a value obtained by integrating a value obtained by subtracting the estimated driving force from the demanded driving force.

2. The vehicle control device according to claim 1, wherein the limiting unit limits the upper limit value according to an amount of operation by a driver of the vehicle, a vehicle state, or a road surface state.

3. The vehicle control device according to claim 1, wherein the vehicle comprises a differential mechanism that applies a torque difference to left and right wheels and a pair of electric motors coupled to the differential mechanism, the vehicle control device controls the slip states of the left and right wheels independently of each other by controlling operating states of the electric motors, and the limiting unit sets, based on a rotational angular velocity of the electric motors, respective upper limit values of the target slip ratios of the left and right wheels.

4. The vehicle control device according to claim 1, wherein the limiting unit has a map that defines a relationship between the vehicle velocity and the upper limit value of the target slip ratio of the wheel, the map has a first vehicle velocity region in which the upper limit value increases with increase in the vehicle velocity and a second vehicle velocity region which is on a higher velocity side than the first vehicle velocity region and in which the upper limit value decreases with increase in the vehicle velocity, an absolute value of an ascent gradient of the upper limit value with respect to the vehicle velocity in the first vehicle velocity region is larger than an absolute value of a descent gradient of the upper limit value with respect to the vehicle velocity in the second vehicle velocity region.

5. The vehicle control device according to claim 4, wherein the map further has a third vehicle velocity region which is on a lower velocity side than the first vehicle velocity region and in which the upper limit value is set to a first predetermined value irrespective of a largeness of the vehicle velocity and a fourth vehicle velocity region which is on a higher velocity side than the second vehicle velocity region and in which the upper limit value is set to a second predetermined value irrespective of a largeness of the vehicle velocity, and the first predetermined value is smaller than the second predetermined value.

* * * * *